C. S. LOCKWOOD.
ROLLER BEARING.
APPLICATION FILED FEB. 19, 1915.

1,144,485. Patented June 29, 1915.

Witnesses
Lora B. Gearhart
J. Walter Greenbow

Inventor
Charles S. Lockwood, per
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING.

1,144,485.  Specification of Letters Patent.  Patented June 29, 1915.

Application filed February 19, 1915. Serial No. 9,256.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearings, fully described and represented in the following specification and the accompanying drawings, forming a part of the same.

This invention relates to a roller-bearing having a conical hub with a set of conical rollers fitted thereto, and a casing having a tapering seat adapted to bear upon the outer sides of the rollers; and the object of the invention is to provide a novel and efficient means of resisting the end thrust which is caused in bearings having tapering rollers, when subjected either to lateral or longitudinal strain. This object is attained by forming each roller with a collar upon one end and forming a shoulder upon the outer casing adapted to engage such collar upon either its inner or outer side; the shoulder being projected inwardly beyond the line of the roll-seat so that the line of contact between the collar and shoulder shall extend equally inside and outside the line of the roll-seat.

Where the bearing between the shoulder and the collar is upon the inner side of the collar, the roll is necessarily necked at such point to clear the shoulder which projects inwardly beyond such line of the roll-seat, but where the shoulder contacts with the outer side of the collar, such necking is not necessary.

In practice, a cage is used to hold the set of rollers in their working position in the casing, and any device for resisting end thrust which tends to tip the rollers in the cage produces a frictional contact and wear, which is very injurious.

With the present construction, the contact of the roll-collar with the shoulder upon the casing produces as great a tendency to accelerate as it does to retard the end of the roller which carries the collar, and such tendencies therefore neutralize or balance one another.

The invention will be understood by reference to the annexed drawing, in which—

Figure 1:
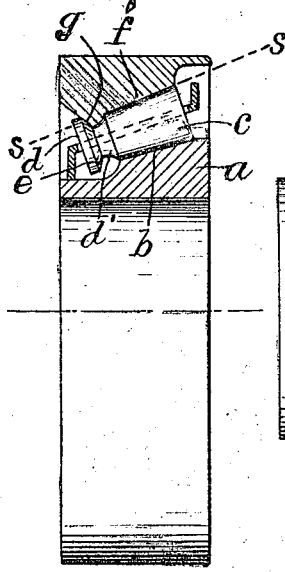
Figure 2:
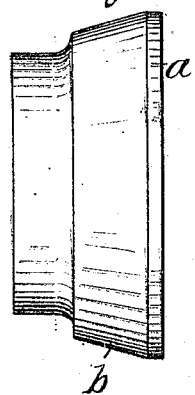
Figure 3:
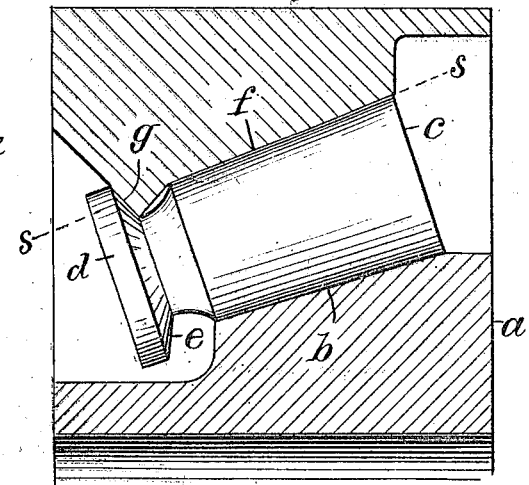
Figure 4:
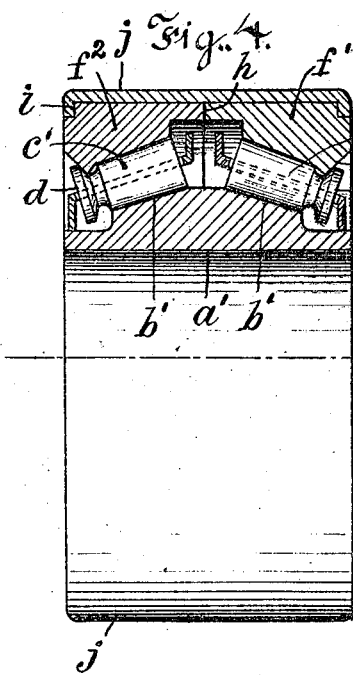
Figure 6:
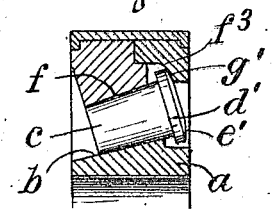
Figure 5:
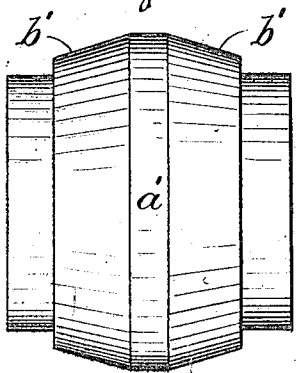

Figure 1 is an edge view, partly in section, of a bearing containing one set of rollers provided with my improvement; Fig. 2 is an edge view of the hub for such bearing; Fig. 3 is a section of the hub, casing, and roller, greatly enlarged; Fig. 4 is an edge view, partly in section where hatched, of a bearing having a double conical hub, and a casing provided with two shoulders to resist the end thrust of the two sets of rollers; Fig. 5 is an elevation of the hub for such bearing; and Fig. 6 is a section like the upper part of Fig. 1, showing an alternative arrangement for the roller and shoulder in the casing.

In Figs. 1 to 4, $a$ designates the hub, with tapering seat $b$, upon which tapering roll-bodies $c$ are fitted, and provided with a collar $d$ upon the smaller end, and a neck $d'$ adjacent to such collar. The inner side of the collar is shown provided with a flared or beveled seat $e$, which makes the collar conical upon its inner side. The casing is provided with a roll-seat $f$ fitting the outer sides of the rollers, and an annular shoulder $g$ formed at a suitable angle with the roll-seat $f$ to fit the bevel $e$ upon the collar $d$, thus making a line contact therewith. The shoulder is formed so as to project into the neck $d$ of the collar and thus crosses the line $s$, $s$, of the roll-seat, the parts being so proportioned that the bearing of the seat $e$ and the shoulder $g$ extends equally inside and outside the line $s$, $s$, so that while one would produce a retarding tendency upon the smaller end of the roller, the other produces an accelerating tendency which balances the retarding influence.

Fig. 4 shows a similar construction for a bearing having two sets of rollers $c'$ and $c^2$, arranged with their smaller ends toward the ends of the casing, and having collars $d$ engaging seats $g$ upon the casing as with the construction shown in Fig. 1.

As the larger ends of the rollers lie in the interior of the casing, it would be impossible to assemble the parts without dividing the casing at the middle of its length, as is shown at the line $h$ in Fig. 4. Such casing parts are formed with rabbet $i$ on their outer corners, so that when all the parts of the casing are assembled a shell $j$ may be fitted over the casing-parts and flanged by spinning into the said rabbets, as shown in the drawing.

In Fig. 6, the collar $d'$ is shown upon the larger end of the roller with the beveled corner $c'$ upon its outer side, and the casing is formed with a groove $f^3$ to clear the margin of such collar, and with an annular shoulder $g'$ adjacent to such groove and shaped to fit the bevel $e'$ upon the outer side of the collar. Any end movement of the rollers between the hub and casing is thus prevented, while any end movement of the casing in relation to the hub is also prevented by the tapering form of the rollers.

Having thus set forth the nature of the invention what is claimed herein is:

1. A roller bearing having a conical hub, a set of tapering rollers fitted to such hub and provided each with a collar upon one end, and a casing fitted to the exterior of the rolls and provided with a shoulder to engage such collar, and the contact between the roller and the shoulder extending equally inside and outside the line of the roll-seat in the casing.

2. A roller bearing having a conical hub, a set of tapering rollers fitted to such hub and provided each with a collar upon one end beveled upon one side, and a casing fitted to the exterior of the rollers and provided with a shoulder adapted to make a line contact with the beveled surface of the collar, and such contact extending equally inside and outside the line of the roll-seat in the casing.

3. A roller bearing having a conical hub, a set of rollers having a tapering body fitted to such hub, a collar upon the smaller end of the roller with a neck adjacent thereto, and a casing fitted to the exterior of the rollers and provided with a shoulder to engage such collar and projecting into the necks of the rolls and bearing upon the said collars inside and outside the line of the roll-seat.

4. In a roller bearing for sustaining lateral and end thrusts, the combination, with a hub tapered in both directions from the middle of its length, of two sets of tapering rollers fitted to the hub and provided each with a collar upon its outer end and a neck adjacent to such collar, a casing formed in two parts each having a tapering seat fitted to one series of the rollers and having a shoulder projecting into the said necks and contacting with the inner sides of the said collars, the shoulders thus making a line contact with the collars equally inside and outside the line of the said seat.

In testimony whereof I have hereunto set my hand in the presence of two subscribing witnesses.

CHARLES S. LOCKWOOD.

Witnesses:
THOMAS S. CRANE,
H. W. ANGEVINE.